May 9, 1967  A. E. KARBOWIAK  3,318,651
WAVEGUIDE FOR TRANSMISSION OF ELECTROMAGNETIC
ENERGY IN THE SUB-MILLIMETER BAND
Filed March 26, 1965  2 Sheets-Sheet 1

Inventor
ANTONI E. KARBOWIAK
By
Attorney

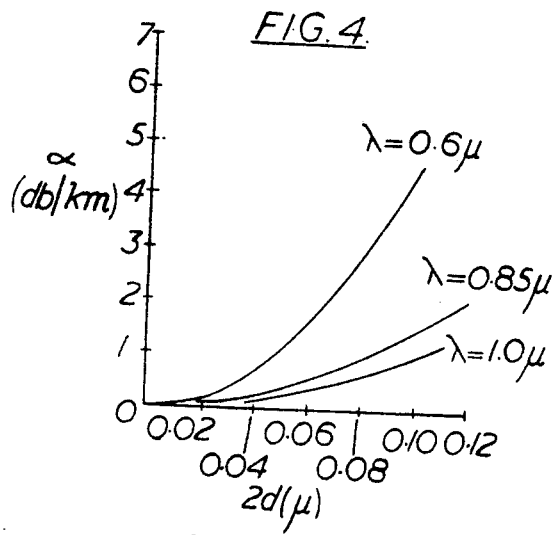
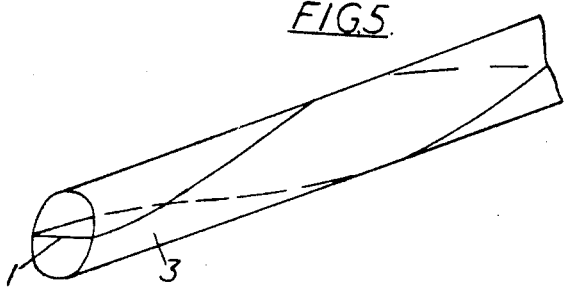
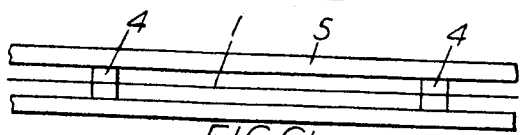
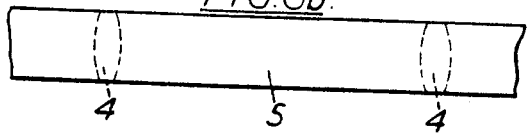

United States Patent Office 3,318,651
Patented May 9, 1967

3,318,651
WAVEGUIDE FOR TRANSMISSION OF ELECTROMAGNETIC ENERGY IN THE SUB-MILLIMETER BAND
Antoni Emil Karbowiak, London, England, assignor to International Standard Electric Corporation, New York, N.Y., a corporation of Delaware
Filed Mar. 26, 1965, Ser. No. 442,903
Claims priority, application Great Britain, Apr. 10, 1964, 14,882/64
6 Claims. (Cl. 350—96)

This invention relates to the guided transmission of electromagnetic energy of free-space wavelength not exceeding one millimetre, having particular but not exclusive reference to the transmission of energy in the visible and near-visible regions of the electromagnetic spectrum, that is to say at wavelengths of less than $3 \times 10^{-2}$ millimetre.

The invention consists in a transmission medium for electromagnetic energy of free-space wavelength not exceeding one millimetre, wherein a strip of solid dielectric material of maximum thickness less than one-half of the wavelength of the transmitted energy and of width greater than one thousand times the said wavelength guides the said energy as an $E_{0x}$ mode surface wave.

The thickness of the film is preferably substantially less than one-half wavelength of the energy to be transmitted, thicknesses in the range of $\lambda/6$ to $\lambda/60$ being suitable. Such a film has to be protected by mounting it inside a hollow support structure: since the energy is guided by the film as a surface wave, with the greater part of the field outside the film itself, the support structure must be spaced away from the film except where actual contact for support is necessary. This may be achieved by supporting the strip at its edges only, for example by clamping the edges of the strip between the opposed edges of identical half-casing members, leaving the centre zone of the strip, to which the field is largely confined, completely unobstructed. Transverse sag of the strip has no appreciable detrimental effect on the guided-wave mechanism. Alternatively the film may be supported within the support structure by elements spaced along its length and arranged to compensate for the loss caused by their presence in the transmission path by preventing excessive divergence of the transmitted energy from the axis of the system. For example, the strip may be supported at intervals by pairs of half-lens elements which clamp the strip between their opposed faces, the pairs of elements forming units of a confocal lens system.

The invention will be described with reference to the accompanying drawings, in which:

FIGS. 3 and 4 show transmission characteristics of the guide,

FIG. 5 shows a first modification of the guide of FIG. 1,

FIGS. 6a and 6b show respectively side and plan view of a second modification of the guide of FIG. 1.

Figure 1:
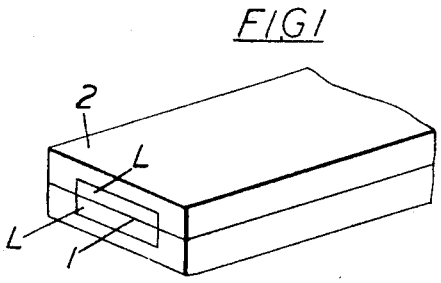
FIG. 1 shows one form of energy guide.

Referring to FIG. 1, a thin film 1 of dielectric material is edge-mounted within a hollow supporting structure 2 having an internal rectangular cross-section such as to leave a clearance L both above and below the central zone of the film 1. The value of L will be discussed later.

Electromagnetic energy is launched along the guide by directing a parallel beam (polarised in a plane normal to the film) edge-on and along the film. The thickness of the film is substantially less than half the wavelength of the energy and the width of the film is in excess of one thousand wavelengths of the energy and such as to admit freely the beam. Any suitable known light source such as a laser beam and a refracting arrangement may be employed as a launching device and a suitable photosensitive device and a refractor may be positioned at the end of the film to receive the energy.

Figure 2:
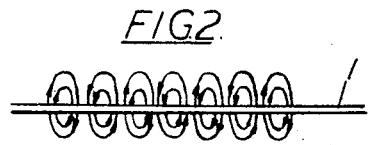
FIG. 2 shows the field structure of a guided wave in the guide of FIG. 1.

Under the assumption that the thickness of the film is a fraction of the wavelength of the energy, the structure can support substantially only the lowest order modes which are designated the $E_{0x}$ modes, wherein the zero indicates that the variation of magnetic field in the thickness of the film does not include any nodal plane parallel to the surface of the film and $x$ represents any integer, which may be large, indicating that there are $x$ magnetic nodal surfaces which are normal to the plane of the film and contain the direction of propagation. This mode is a plane surface wave which is symmetrical with respect to the mid-plane of the film (FIG. 2). Most of the energy is carried in the space outside the film and only a small fraction is found within the film. For this reason the attenuation of the wave is considerably smaller than the extinction coefficient of the material of which the film is made. Furthermore the velocity of the wave is very nearly the free-space velocity of light and, consequently, the delay distortion, frequently responsible for signal distortion, is negligibly small.

The thicker the film the lesser the transverse spread of the field, but the thinner the film the lower the attenuation of the guide.

The energy is guided by the film in that the film can be bent in the plane normal to the plane of the film with little loss of energy. The wave, however, is not guided in the plane of the film, but obeys approximately the laws of radiation and consequently if the film were bent in its own plane large signal losses would occur. On the other hand the film can be twisted without any noticeable loss of energy and the combination of bend in one plane and twist enables the guide to negotiate bends in any plane.

The wave is attenuated exponentially like any other guided wave, but unlike guided waves it is also subjected to diffraction losses as a consequence of the finite dimension of the beam in the plane of the guiding film. The total attenuation is, therefore, of two kinds: (1) exponential attenuation due to the absorption of the energy in the film, and (2) decrease of energy inversely proportional to distance (radiation in one plane), i.e., the available energy decreases at a rate of 3 db every time the film is doubled in length.

The behaviour of infinite plane surface waves in stratified media has been discussed by a number of investigators and the analytical expressions take on simple forms of the thickness of the dielectric sheet i.e., the film 1 involved is small compared with wavelength. These formulae can be readily adapted for our applications as follows:

Let $\omega = 2\pi x$ frequency $\mu_0$, $\epsilon_0$ permeability and permittivity of free space $\epsilon_1$ permittivity of the dielectric sheet $= n^2 =$ square of the refractive index.

In general, because of absorbtion of energy in the dielectric material we can define complex permittivity, $\epsilon_1'$ by the expression $$\epsilon_1' = \epsilon_1(1 - j \tan \delta) = n^2 - jn^2 \tan \delta \qquad (1)$$

where $\tan \delta$ is the effective loss tangent of the dielectric which is related to the extinction coefficient, $\alpha$ by $$\alpha_1 = 2\frac{\omega}{c} \tan \delta \qquad (2)$$

where $c$ is the velocity of light.

The field components of the surface wave have the functional form $$exp(-ax).exp-(\alpha+j\beta)z \tag{3}$$

where $z$ is distance measured along the film in the direction of wave propagation and $x$ is the distance measured from the film in a direction perpendicular to the film.

$\beta$ is the phase propagation coefficient of the wave, $\alpha$ the attenuation coefficient, and $a$ is the transverse decay coefficient.

The energy density decreases exponentially at a rate $2a$ and it is attenuated at a rate of $2\alpha$ with distance along the film.

The coefficient $a$ is given by $$a = \omega^2 \mu . \epsilon_0 \left(1 - \frac{1}{n^2}\right)(2d) \tag{4}$$

where $(2d)$ is the total thickness of the film.

The attenuation coefficient $\alpha$ is given by $$= 8\pi^3 \left(\frac{d}{\lambda}\right)^2 \frac{1}{n^2\lambda} \left(1 - \frac{1}{n^2}\right) \tan \delta \tag{5}$$

These formulae are valid provided the thickness of the film is less than about one tenth of the wavelength, and indicate, for good transparent media, attenuation figure of the order of a few db/km. and transverse film extension of less than a few microns. For thicker films exact formulae must be used. The important thing to observe is that the decay coefficient $a$ can be decreased (linearly) by increasing the thickness of the film, but that the attenuation increased with the square of the same quantity. Attenuation is also proportional to $\tan \delta$ and inversely proportional to the cube of the wavelength.

A more useful parameter instead of $a$ is $l_0$. This is a characteristic transverse distance, which is defined as that distance from the film within which 99.9% of energy is confined. Clearly for efficient transmission the guide must be constructed in such a way as to provide a clearance of at least $l_0$ so that $L > l_0$, $L$ having been referred to earlier.

Figure 3:
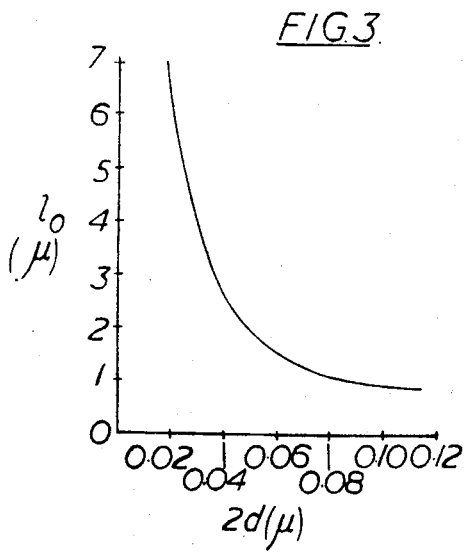

FIGS. 3 and 4 show respectively plots of the quantities $l_0$ and $\alpha$ for various film thicknesses using a silicate glass which has the following composition: $SiO_2$ 44.6%, $Na_2O$ 0.5%, $K_2O$ 8.8%, $PbO$ 46.6%, $As_2O_5$ 0.3%.

It will be observed from FIG. 3 that (with $\lambda = 0.6\mu$) the field is essentially confined to less than $10\lambda$ for films as thin as 200 A. and to less than $1\mu$ for a film 1000 A. thick. At the same time the attenuation (FIG. 4) is less than 1 db/km. for a $0.1\mu$ thick film at $\lambda = 1\mu$, and for films 200 A thick the attenuation is a small fraction of 1 db/km.

Instead of glass suitable transparent plastics can be used. Thus, for example, polymethyl methacrylate has an extinction coefficient which is 19 times larger than that of the glass referred to above, but has a refractive index of 1.49 as compared with 1.62 for glass. The attenuation of the surface wave is, consequently, substantially greater (about a factor of 20) and a thinner film becomes desirable. For a film of $0.05\mu$ the attenuation becomes about 4 db/km., and correspondingly for other thicknesses and wavelengths.

In principle, any transparent material is suitable as the thin-film guide, but the thinner the film and the smaller the extinction coefficient of the material, the smaller will be the attenuation.

It will be seen that the invention offers a relatively low-loss transmission medium for electromagnetic energy extending from the sub-millimetre band down to the visible region of the spectrum, subject only to the availability of a dielectric film of suitable thickness. From the examples given in preceding paragraphs it will be noted that transmission at visible or near-visible wavelengths demands films of thickness 0.1 micron or less. The difficulty in producing such films with current technology may initially restrict the use of the invention to wavelengths in the sub-millimetre range: at these wavelengths the film thickness required, of the order of 1 micron, appears practicable with materials such as polymethyl methacrylate.

Scaled-up experiment, at a wavelength of $\lambda = 8.6$ mm., using polyethylene films having thicknesses in the range 0.25 mm. to 0.75 mm., has confirmed the presence of a very pronounced surface wave, which is guided by the film having negligible attenuation over distances of the order of metres.

The increase in loss due to the twisting of the film was also immeasurably small for twists as sharp as one revolution per 100 wavelengths.

The loss due to a sharp bend was, for a typical setting, under 2 db per radian and was independent of the radius of bend for bending radia down to a few hundred wavelengths.

The physical appearance of the thin-film guide is a function of technological convenience. FIG. 1 shows a possible configuration but a circular tube could clearly be used. The tube acts merely as a protection and support for the film and plays no active part in the functioning of the device. It may, however, be desirable to paint the inside of the protective tube with a black absorbing paint to ensure that the light lost due to radiation at bends is absorbed rather than returned to the guide and cause possible signal distortion.

The disadvantage of the construction illustrated in FIG. 1 is that the guide can be bent only in one plane and to overcome this, a modified construction is shown in FIG. 5. In this construction the film 1 is edge-mounted within a circular protective tube 3, in the shape of a helix. A guide of this construction is capable of negotiating bends in any plane provided that the radius of curvature remains large in comparison with the lay of the helix. Guides of this type are suitable for negotiating bends of moderate curvature, but for sharp corners the structure shown in FIG. 1 has distinct advantages.

Yet another method of mounting the thin film is shown in FIG. 6. Here the film 1 is supported by means of a confocal system of miniature cylindrical lenses 4, which are in turn contained between upper and lower support plates 5 forming part of the enclosing support structure.

It is to be understood that the foregoing description of specific examples of this invention is not to be considered as a limitation on its scope.

What I claim is:

1. A transmission medium for electromagnetic energy in the visible and near visible frequency range of free-space wavelength not exceeding one millimetre, including a strip of solid dielectric material of maximum thickness less than one-half of the wavelength of the transmitted energy and of width greater than one thousand times the said wavelength, said strip guiding the said energy as a lowest order mode surface wave along the length of said strip, and means supporting said strip in the path of said energy.

2. A transmission medium according to claim 1, wherein the said strip is transparent and is supported by its edges only within a hollow longitudinal support structure, said wave being substantially confined to the space about the center of said strip and symmetrical with respect to the mid-plane thereof.

3. A transmission medium according to claim 2, wherein the strip is held by its edges between opposed faces of two identical half-casing members together forming the said support structure.

4. A transmission medium according to claim 1, wherein the said strip is supported within a hollow support structure by support elements spaced along the length of the strip.

5. A transmission medium according to claim 4, wherein the said support elements together form a confocal lens system.

6. A transmission medium according to claim 1, wherein the plane of the strip is progressively twisted about its longitudinal axis in the form of a helix to permit changing the direction of the wave.

References Cited by the Examiner

UNITED STATES PATENTS 2,685,068   7/1954   Goubou _____ 333—95

ELI LIEBERMAN, *Primary Examiner.*

L. ALLAHUT, *Assistant Examiner.*